US006959058B2

(12) United States Patent
Yoo et al.

(10) Patent No.: US 6,959,058 B2
(45) Date of Patent: Oct. 25, 2005

(54) DATA RECOVERY APPARATUS AND METHOD FOR MINIMIZING ERRORS DUE TO CLOCK SKEW

(75) Inventors: Duck-hyun Yoo, Suwon (KR); Gun-sang Lee, Seoul (KR); Jin-kug Lee, Seoul (KR)

(73) Assignee: Samsung Electronics Co., Ltd., (KR)

(*) Notice: Subject to any disclaimer, the term of this patent is extended or adjusted under 35 U.S.C. 154(b) by 828 days.

(21) Appl. No.: 09/879,434

(22) Filed: Jun. 12, 2001

(65) Prior Publication Data

US 2002/0027964 A1  Mar. 7, 2002

(30) Foreign Application Priority Data

Sep. 2, 2000 (KR) .............................. 2000-51822

(51) Int. Cl.[7] .............................. H04L 7/00; H03D 3/24
(52) U.S. Cl. ...................... 375/355; 375/371; 375/354
(58) Field of Search ................................ 375/355, 354, 375/371, 357, 373

(56) References Cited

U.S. PATENT DOCUMENTS

| 3,946,379 A | * | 3/1976 | Lippman ..................... 341/100 |
| 4,189,622 A |   | 2/1980 | Foshee ....................... 178/69.1 |
| 5,245,637 A |   | 9/1993 | Gersbach et al. ........... 375/374 |
| 5,313,496 A | * | 5/1994 | de Goede ................... 375/342 |

(Continued)

FOREIGN PATENT DOCUMENTS

EP  0738057 A2  10/1996  ............. H04L 7/04

(Continued)

OTHER PUBLICATIONS

Masakazu Kitazawa, *A Bit Synchronization Technique for PDS Optical Subscriber Loop Systems*, Proceedings of the Local Optical Networks, 1991.

(Continued)

Primary Examiner—Chieh M. Fan
Assistant Examiner—Jason M. Perilla
(74) Attorney, Agent, or Firm—F. Chau & Associates LLC (57) ABSTRACT

A data recovery apparatus for minimizing errors due to clock skew and a data recovery apparatus therefor are provided. The data recovery apparatus comprises a phase locked loop (PLL), an oversampler, a level transition detector, a transition accumulator, a state selector, and a data selector. The PLL generates a plurality of phase clock signals having different delay times, which signals are synchronized with an input clock signal. The oversampler 110 M (>1) times oversamples data serially input from the outside in response to the plurality of phase clock signals and outputs the oversampled result as a plurality of bit data items. The level transition detector receives the plurality of bit data output from the oversampler, detects the point of time at which the level transitions between adjacent bits and outputs the detection result as first through Mth transition signals. The transition accumulator accumulates the number of generations of the first through Mth transition signals output from the level transition detector and outputs a signal whose generation frequency is high as first through Mth transition accumulation signals. The state selector generates a state signal for selecting bit data items of corresponding positions among the plurality oversampling data items in response to the first through Mth transition accumulation signal. The data selector receives the oversampled plurality of bit data, selects bit data items of the sampling positions corresponding to the state signal, and outputs the selected bit data items in parallel. It is possible to minimize errors due to clock skew, which can be generated during the reproduction of data.

19 Claims, 8 Drawing Sheets

U.S. PATENT DOCUMENTS

| | | | |
|---|---|---|---|
| 5,587,709 A | 12/1996 | Jeong | 341/100 |
| 5,864,250 A | 1/1999 | Deng | 327/165 |
| 5,963,606 A | 10/1999 | Drost et al. | 375/371 |
| 5,974,097 A | 10/1999 | Julyan et al. | 375/340 |
| 6,044,121 A | 3/2000 | Nolan et al. | 375/354 |
| 6,055,286 A | 4/2000 | Wu et al. | 375/375 |
| 6,272,193 B1 * | 8/2001 | Eglit | 375/355 |

FOREIGN PATENT DOCUMENTS

| | | | | |
|---|---|---|---|---|
| EP | 0738057 A3 | 10/1996 | | H04L 7/04 |
| EP | 0921654 A2 | 6/1999 | | H04L 7/033 |
| EP | 0921654 A3 | 6/1999 | | H04L 7/0333 |

OTHER PUBLICATIONS

Jun-Young Park, et al., *A 1.0 Gbps CMOS Oversampling Data Recovery Circuit with Fine Delay Generation Method*, IEICE Trans. Fundamentals, vol. E83-A, No. 6, Jun. 2000, pp. 1100-1105.

Chi-Kong Ken Yang, et al., *A 0.5 μm CMOS 4.0-Gbit/s Serial Link Transceiver with Data Recovery Using Oversampling*, IEEE Journal of Solid-State Circuits, vol. 33, No. 5, May 1998, pp. 713-721.

* cited by examiner

DATA RECOVERY APPARATUS AND METHOD FOR MINIMIZING ERRORS DUE TO CLOCK SKEW

BACKGROUND

1. Technical Field

The present invention relates generally to a data transmission system and, more particularly, to a data recovery circuit and method for minimizing errors due to clock skew.

2. Description of Related Art

In general, in a data transmission system for transmitting predetermined data, the use of parallel transmission channels is a popular method for digitally interfacing systems. However, problems may occur with this method of using the parallel transmission channels if the number of data transmission channels increases. Consequently, a serial transmission method is gradually replacing the parallel transmission method.

With the serial transmission method, the number of channels used for transmitting data is less than the number of channels used for transmitting data using the parallel transmission method. However, in most cases, when data is transmitted using serial transmission channels, a high speed serial signal must be converted to a parallel data format at a receiving end. When serial data is converted to the parallel data format, it may be difficult to recover data due to clock skew at the receiving end.

Using conventional technology, in order to solve such a problem, a bit section of a received signal is sampled many times and a data level is determined by detecting the generation frequency of the sampled result. With this method of determining data by detecting the generation frequency of data, however, errors may occur in a portion at which the level of data is converted due to the accumulation of clock skew. For example, in a level transition section, in which the level of data is transited from a logic "high" level to a logic "low" level or from the logic "low" level to a logic "high" level, there is every possibility that the data determined by the generation frequency thereof is not real data but erroneous data.

SUMMARY OF THE INVENTION

To solve the above problems, it is an object of the present invention to provide a data recovery apparatus for stably recovering data regardless of clock skew while receiving of data.

It is another object of the present invention to provide a data recovery method for stably recovering data regardless of clock skew while receiving of data.

Accordingly, to achieve the first object, there is provided a data recovery apparatus. The data recovery apparatus includes a phase locked loop (PLL), oversampling means, a level transition detector, a transition accumulator, a state selector, and a data selector. The PLL generates a plurality of phase clock signals, which are synchronized with an input clock signal and have different delay times. The oversampling means M (>1) times oversamples data serially input from the outside in response to the plurality of phase clock signals and outputs the oversampled result as a plurality of bit data items. The level transition detector receives the plurality of bit data output from the oversampling means, detects the point of time at which the level transits between adjacent bits and outputs the detection result as first through Mth transition signals. The transition accumulator accumulates the number of generations of the first through Mth transition signals output from the level transition detector and outputs a signal whose generation frequency is high as first through Mth transition accumulation signals. The state selector generates a state signal for selecting bit data items of corresponding positions among the plurality oversampling data items in response to the first through Mth transition accumulation signal. The data selector receives the oversampled plurality of bit data, selects bit data items of the sampling positions corresponding to the state signal, and outputs the selected bit data items in parallel.

To achieve the second object, a data recovery method is provided comprising the steps of:

(a) receiving as input serial data in blocks of K bits and performing an M times oversampling on each block of serial data using N phase clock signals having different delay times to output N data bits in parallel;

(b) detecting a transition in a level between adjacent ones of the N data bits and outputting one of a first through Mth transition signals at the point of time of a detected level transition;

(c) accumulating the number of generations of each of the first through Mth transition signals;

(d) detecting the transition signal whose generation frequency meets a predefined threshold; and (e) selecting from the N data bits, K data bits corresponding to the detected transition signal.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

Figure 1:
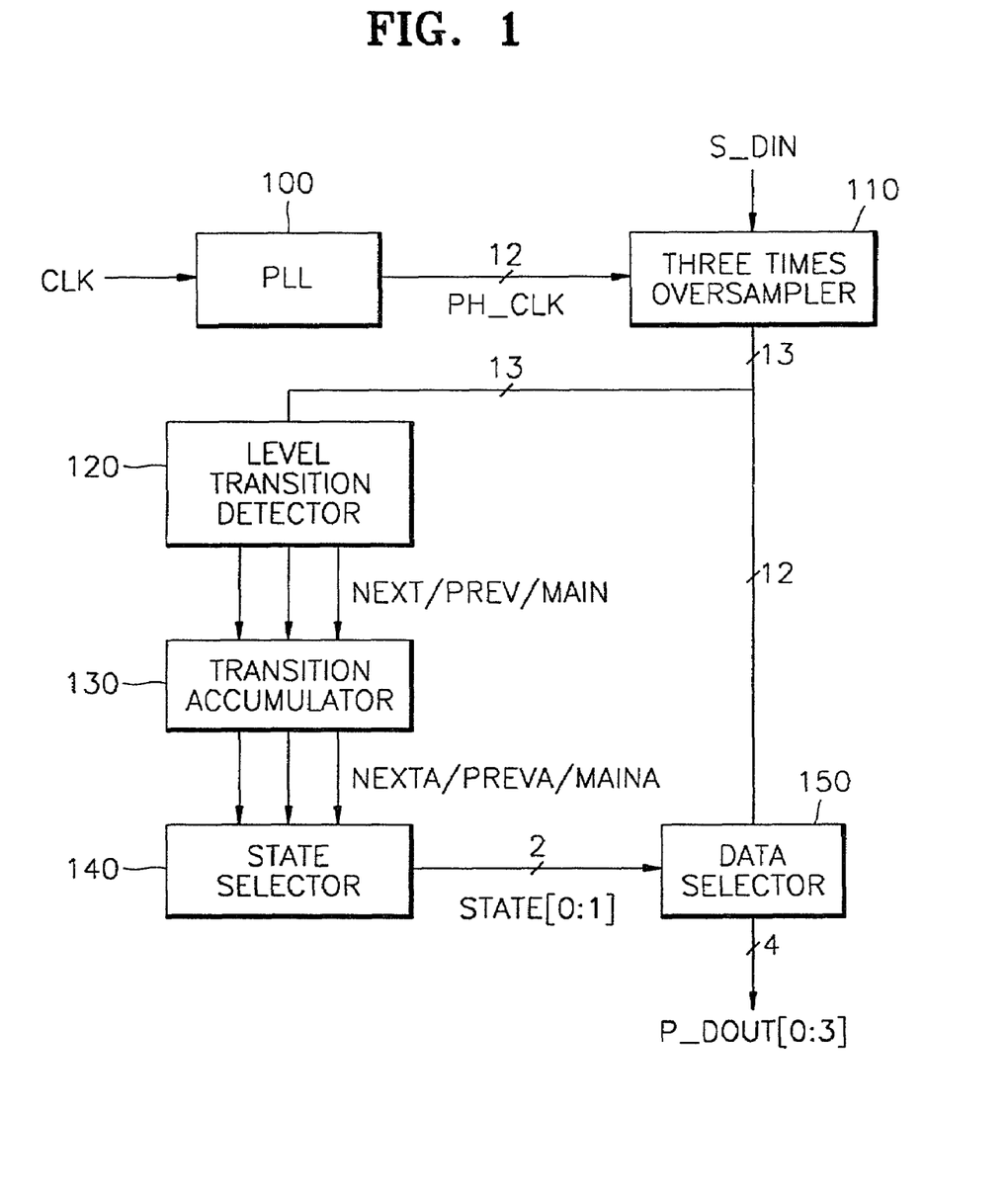
FIG. 1 is a schematic block diagram illustrating a data recovery apparatus for minimizing errors due to clock skew according to an embodiment of the present invention.

Referring now to FIG. 1, a block diagram illustrates a data recovery apparatus for minimizing errors due to clock skew according to an embodiment of the present invention. The data recovery apparatus comprises a phase locked loop (PLL) 100, a three-times oversampler 110, a level transition detector 120, a transition accumulator 130, a state selector 140, and a data selector 150.

The PLL 100 generates a predetermined number of phase clock signals PH_CLK, which are synchronized with an input clock signal CLK. Here, each of the phase clock signals PH_CLK have different delay times with respect to the input clock signal CLK. In the embodiment of FIG. 1, it is assumed that the phase clock signals PH_CLK have twelve different delay times. The phase clock signals PH_CLK are received by the three-times oversampler 110 in parallel and are used as sampling clock signals.

The oversampler 110 three-times oversamples data S_DIN, which is serially input from an external source, in response to the phase clock signals PH_CLK, and then outputs the oversampling result as N-bit parallel data. Preferably, the input data S_DIN is a signal comprising units of four bits, which is serially input from an external transmission side. Namely, the oversampler 110 samples one bit section of the data, which is serially input in units of four bits, three times and outputs the sampling result. The data output from the three-times oversampler 110 becomes thirteen (13) bits due to the addition of twelve (12) bits resulting from three-times sampling the serial data of four bits synchronized with the current clock signal and one (1) most significant bit (MSB) of a serial data synchronized with the next clock signal CLK. Here, the last one bit synchronized with the next clock signal CLK can be obtained by delaying the output of the three-times oversampler 110.

The level transition detector 120 receives the thirteen bits of data output from the three-times oversampler 110, senses points of time at which the level transitions between the respective bits, and outputs the sensing result respectively as first, second, and third transition signals NEXT/PREV/MAIN. Here, the first, second and third transition signals NEXT/PREV/MAIN represent three states that can be shown in the three-times oversampler 110 by the clock skew of the input clock signal CLK and show the result of dividing the point of time at which the level of the sampled data transitions.

The transition accumulator 130 accumulates the transition signals PREV/MAIN/NEXT output by the level transition detector 120 and generates a first, second and third transition accumulation signals NEXTA/PREVA/MAINA. More specifically, the transition accumulator 130 outputs as the transition accumulation signal one of the first, second and third transition signals NEXT/PREV/MAIN having the highest generation frequency.

The state selector 140 generates a state signal STATE for selecting bit data items of a corresponding position among the outputs of the three-times oversampler 110 in response to the accumulation signals NEXTA/PREVA/MAINA. Here, the state signal STATE is preferably represented with two bits and is applied to the data selector 150 as a selection control signal.

The data selector 150 receives the twelve bits of data sampled by the three-times oversampler 110, selects the bit data items of the sampling position corresponding to the state signal STATE, and outputs the selected bit data items as parallel data. The data selector 150 receives twelve of the thirteen bits output (in parallel) from the oversampler 110, excluding the one bit corresponding to the next clock signal. In addition, the data selector 150 selects one bit among three bits of different positions, which are sampled three times in the one bit section of the serial data. Therefore, the data selector 150 outputs parallel data P_DOUT[0:3] of total four bits by one bit in each serial data.

Advantageously, a data recovery apparatus according to the present invention, having an architecture as described above, three-times oversamples one bit section of the input serial signal and selects one bit among the sampled three bits by the point of time at which the level of the oversampled data transitions. Therefore, it is possible to stably recover data even though skew is generated in the input clock signal.

Figure 2:
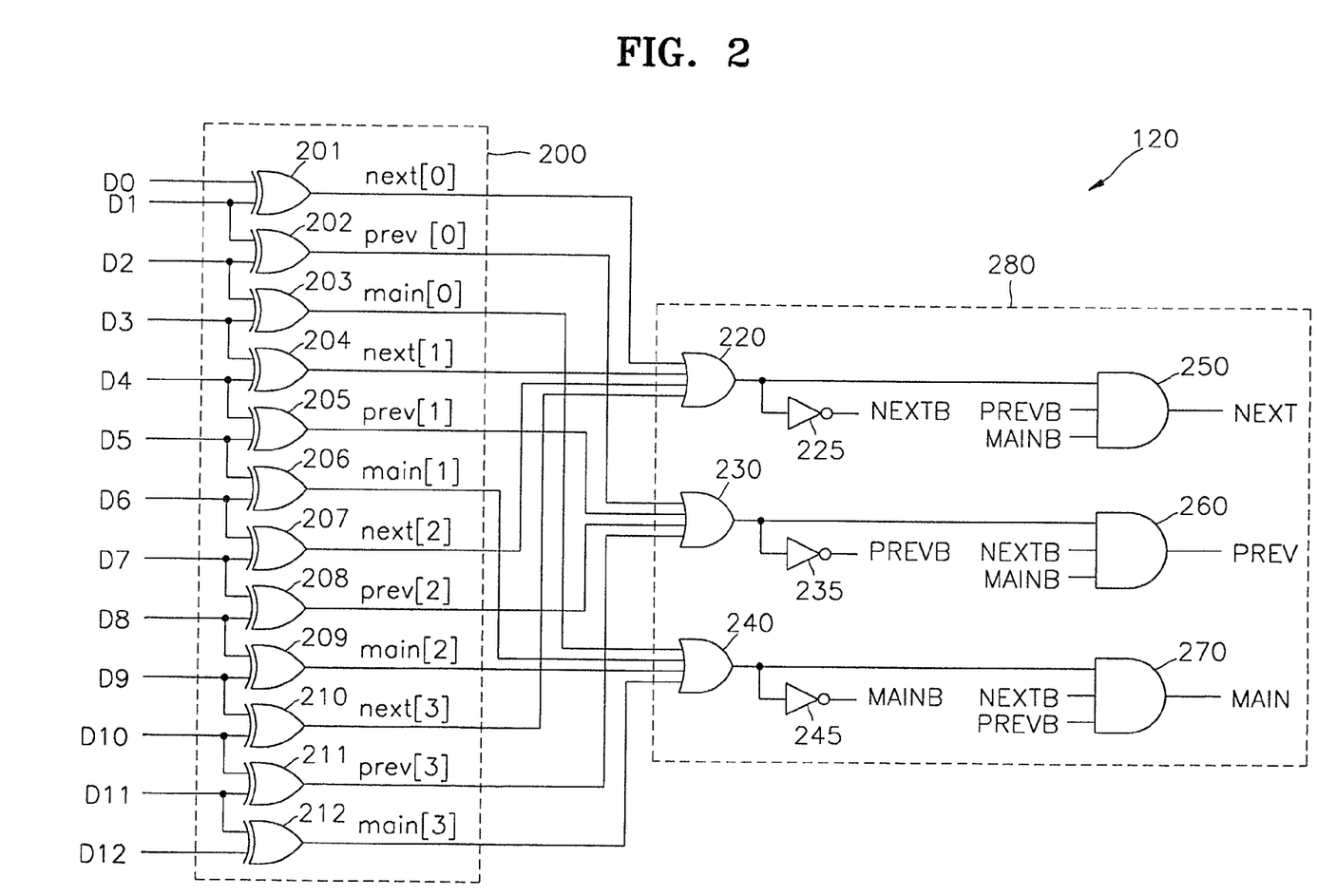
FIG. 2 is a circuit diagram illustrating a level transition detector of the apparatus of FIG. 1.

FIG. 2 is a circuit diagram illustrating a preferred embodiment of the level transition detector 120 in FIG. 1. Referring to FIG. 2, the level transition detector 120 comprises a transition detector 200 and a transition detection signal outputting unit 280. The transition detector 200 receives thirteen bits of data output from the three-times oversampler 110 and senses transitions in level between adjacent bits. The transition detector 200 comprises a plurality of exclusive OR gates 201 through 212. The input bits D0 through D12 represent the thirteen bits of data that are output from the three-times oversampler 110.

Each of the exclusive OR gates 201 through 212 comprising the transition detector 200 perform an exclusive OR operation on two adjacent bits among the thirteen data items D0–D12, and outputs the exclusive OR result as a first output signal (next), a second output signal (prev), and a third output signal (main). The twelve bits of data output from the transition detector 200 are divided into units of three bits. Namely, it is determined that the level of an output signal transitions at a point at which the outputs of the exclusive OR gates 201–212 are at the logic "high" level, and it is determined to which case the transition in the current input data corresponds among the three output signals main, prev, and next.

More specifically, the exclusive OR gate 201 performs an exclusive OR operation on a first bit D0 and a second bit D1 and generates a first output signal next[0]. The first output signal next[0] is the result of sensing a transition in level between D0 and D1. It is determined that the level of the output signal transitions when the output of the exclusive OR gate 201 is at the logic "high" level. In addition, the exclusive OR gate 202 performs an exclusive OR operation on the second bit D1 and a third bit D2 and generates a second output signal prev[0]. The second output signal prev[0] is the result of sensing a transition in level between D1 and D2. The exclusive OR gate 203 performs an exclusive OR operation on the third bit D2 and a fourth bit D3 and generates a third output signal main[0]. The third output signal main[0] is the result of sensing a transition in level between D2 and D3.

Likewise, the exclusive OR gates 204–206 perform an exclusive OR operation on two adjacent data bits and generate first, second, and third output signals next[1], prev[1], and main[1]. The exclusive OR gates 207–209 generate first, second, and third output signals next[2], prev[2], and main[2]. Further, the exclusive OR gates 210–212 generate first, second, and third output signals next[3], prev[3], and main[3]. The result of performing an exclusive OR operation on the thirteen bits input data is divided in units of three bits, sequentially.

In general, the transition detection signal outputting unit 280 of the level transition detector 120 performs a logical combination of all corresponding output signals next, prev, and main output from the transition detector 200, and then outputs the logic combination result as a first transition signal NEXT, a second transition signal PREV, and a third transition signal MAIN. The transition detection signal outputting unit 280 comprises OR gates 220, 230, and 240, invertors 225, 235, and 245, and AND gates 250, 260, and 270.

More specifically, the OR gate 220 performs an OR operation on the first output signals next[0] through next[3].

The inverter 225 inverts the output signal of the OR gate 220 and outputs the inversion result, i.e., a first inversion signal NEXTB.

The OR gate 230 performs an OR operation on the second output signals prev[0] through prev[3] output from the transition detector 200. The inverter 235 inverts the output signal of the OR gate 230 and outputs the inversion result, i.e., a second inversion signal PREVB.

The OR gate 240 performs an OR operation on the third output signals main[0] through main[3] output from the transition detector 200. The inverter 245 inverts the output signal of the OR gate 240 and outputs the inversion result, i.e., a third inversion signal MAINB.

The AND gate 250 performs an AND operation on the output signal of the OR gate 220 and the second and third inverted signals PREVB and MAINB and outputs the AND operation result as the first transition signal NEXT. The AND gate 260 performs an AND operation on the output signal of the OR gate 230 and the first and third inverted signals NEXTB and MAINB and outputs the AND operation result as the second transition signal PREV. The AND gate 270 performs an AND operation on the output signal of the OR gate 240 and the first and second inverted signals NEXTB and PREVB and outputs the AND operation result as the third transition signal MAIN.

Figure 3:
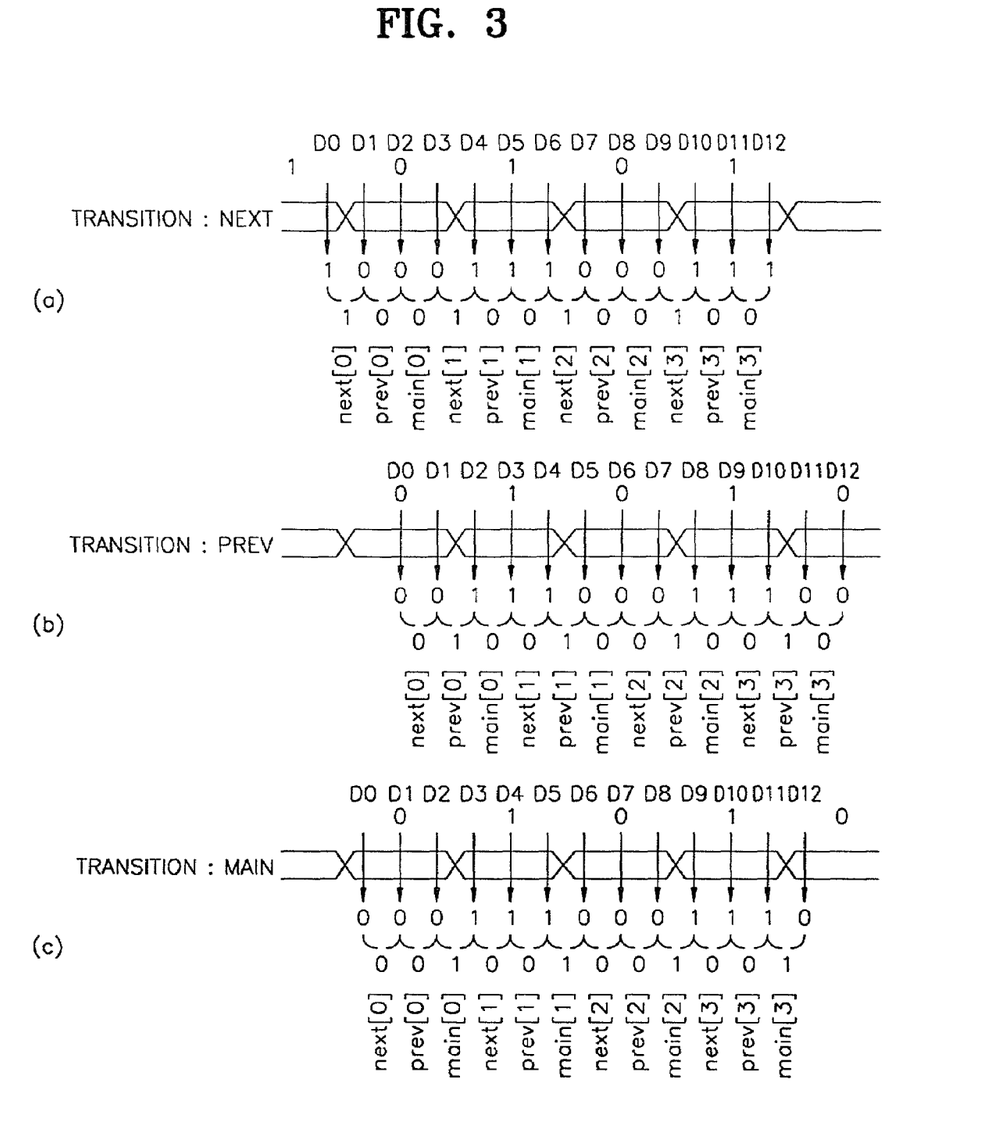
FIGS. 3A through 3C illustrate the operation of the level transition detector of FIG. 2.

FIGS. 3a, 3b and 3c illustrate an operation of the level transition detector 120 according to one aspect of the present invention. FIG. 3a illustrates a case in which the first transition signal NEXT is generated according to the point of time at which the level transits. FIG. 3b illustrates a case in which the second transition signal PREV is generated. FIG. 3c illustrates a case, in which the third transition signal MAIN is generated. FIGS. 3a, 3b and 3c illustrate the output states of the sampling data, which can be shown by the skew of the input clock signal CLK. The operation of the level transition detector 120 of FIG. 2 will now be described in detail with reference to FIGS. 2 and 3.

Referring to FIG. 3A, the phase of the phase clock signal PH_CLK based on the input clock signal CLK leads the phase of the input data S_DIN. Here, it is assumed that 0 and 1 are repeated as shown in FIG. 3A in the serially input data in units of four bits. In this case, since the input bit D0 of FIG. 3A is "1" and the input bit D1 of FIG. 3A is "0", the output next[0] of the exclusive OR gate 201 transitions to the logic "high" level. At the same time, the outputs of the exclusive OR gates 202 and 203 transition to the logic "low" level. Since the input bits D3 and D4 have different levels, the output next[1] of the exclusive OR gate 204 transitions to the logic "high" level at the point of time at which the data level transitions. The first output signals (next) of the transition detector 200 are at the logic "high" level and the third output signals (main) and the second output signals (prev) are at the logic "low" level. Namely, referring to FIG. 3A, the level transitions between the first bit and the second bit of each of the four groups of three bits.

At this time, the OR gate 220 of the transition detection signal outputting unit 280 shown in FIG. 2 outputs a logic "high" level signal. Since the second output signals (prev) and the third output signals (main) are at the logic "low" level, the output signals of the OR gates 230 and 240 transition to the logic "low" level. Therefore, the output signal of the AND gate 250, namely, the first transition signal NEXT, transitions to the logic "high" level and the output signals PREV and MAIN of the AND gates 260 and 270 transition to the logic "low" level. As a result, when the first transition signal NEXT is at the logic "high" level and the other signals PREV and MAIN are at the logic "low" level, the point of time at which the data level transitions is as illustrated in FIG. 3A. In this case, as mentioned later, when D2, D5, D8, and D11 are selected among the input data bits, a sampling value is obtained in a central portion, that is, a stable portion in the one bit section of serial data items.

As mentioned above, FIG. 3B illustrates a case where the phase of the input clock signal CLK lags the phase of the serial data S_DIN. At this time, since the input bit D1 of FIG. 3B is "0" and the input bit D2 is "1", the output prev[0] of the exclusive OR gate 202 transitions to the logic "high" level. Also, the outputs of the exclusive OR gates 201 and 203 transition to the logic "low" level. Also, since the level of the input bit D4 is different from the level of the input bit D5, the output of the exclusive OR gate 205 transitions to the logic "high" level at the point of time at which the data level transits. The second output signals prev of the transition detector 200 transition to the logic "high" level. Here, the third output signals main and the first output signals next transition to the logic "low" level. Namely, there is a transition in level between the second bit and the third bit in each of the four groups of data items, which are comprised of three bits.

At this time, the OR gate 230 of the transition detection signal outputting unit 280 outputs a logic "high" level signal. Also, since the first output signals next and the third output signals main are at the logic "low" level, the output signals of the OR gates 220 and 240 transition to the logic "low" level. Therefore, the second transition signal PREV output through the AND gate 260 transitions to the logic "high" level and the first and third transition signals NEXT and MAIN output through the AND gates 250 and 270 transition to the logic "low" level. As a result, when the second transition signal PREV transitions to the logic "high" level and the other transition signals NEXT and MAIN are at the logic "low" level, the point of time at which the level transitions is as shown in FIG. 3B. In this case, when D0, D3, D6, and D9 are selected among the input data items of FIG. 3B, it is possible to obtain a stable sampling value in the one bit section of the serial data.

As mentioned above, the case shown in FIG. 3C, that is, the case where the third transition signal MAIN is generated, will now be explained. FIG. 3C illustrates the case where the phase of the input clock signal CLK is the same as the phase of the input data S_DIN. At this time, the output signal MAIN of the OR gate 240 and the NAND gate 270 transitions to the logic "high" level by the output signals main[0] through main[3] of the exclusive OR gates 203, 206, 209, and 212. However, since the method of transitioning the output signal MAIN of the OR gate 240 and the NAND gate 270 to the logic "high" level is the same as mentioned above, a detailed description will be omitted.

Namely, when the point of time at which the level transitions between the adjacent bits is as shown in FIG. 3C, there is a transition in level between each third bit among data items of four groups by three bits and the first bit of the next group. As a result, the third transition signal MAIN transitions to the logic "high" level. In this case, when D1, D4, D7, and D10 are selected among the input bits, the sampling value of the central portion is obtained in the one bit section of the serial data.

However, when the clock skew is severe, the transition signals NEXT, PREV, and MAIN of FIG. 2 can be simultaneously generated. In this case, the outputs of the respective AND gates 250, 260, and 270 transition to the logic "low" level by the inverted signals NEXTA, PREVA, and MAINA of the respective transition signals. When the clock skew is severe, the output of the level transition detector 120 is reset in itself. Namely, since the level transition detector 120 outputs only stable data, it is possible to prevent mis-operation of a data recovery apparatus.

Figure 4:
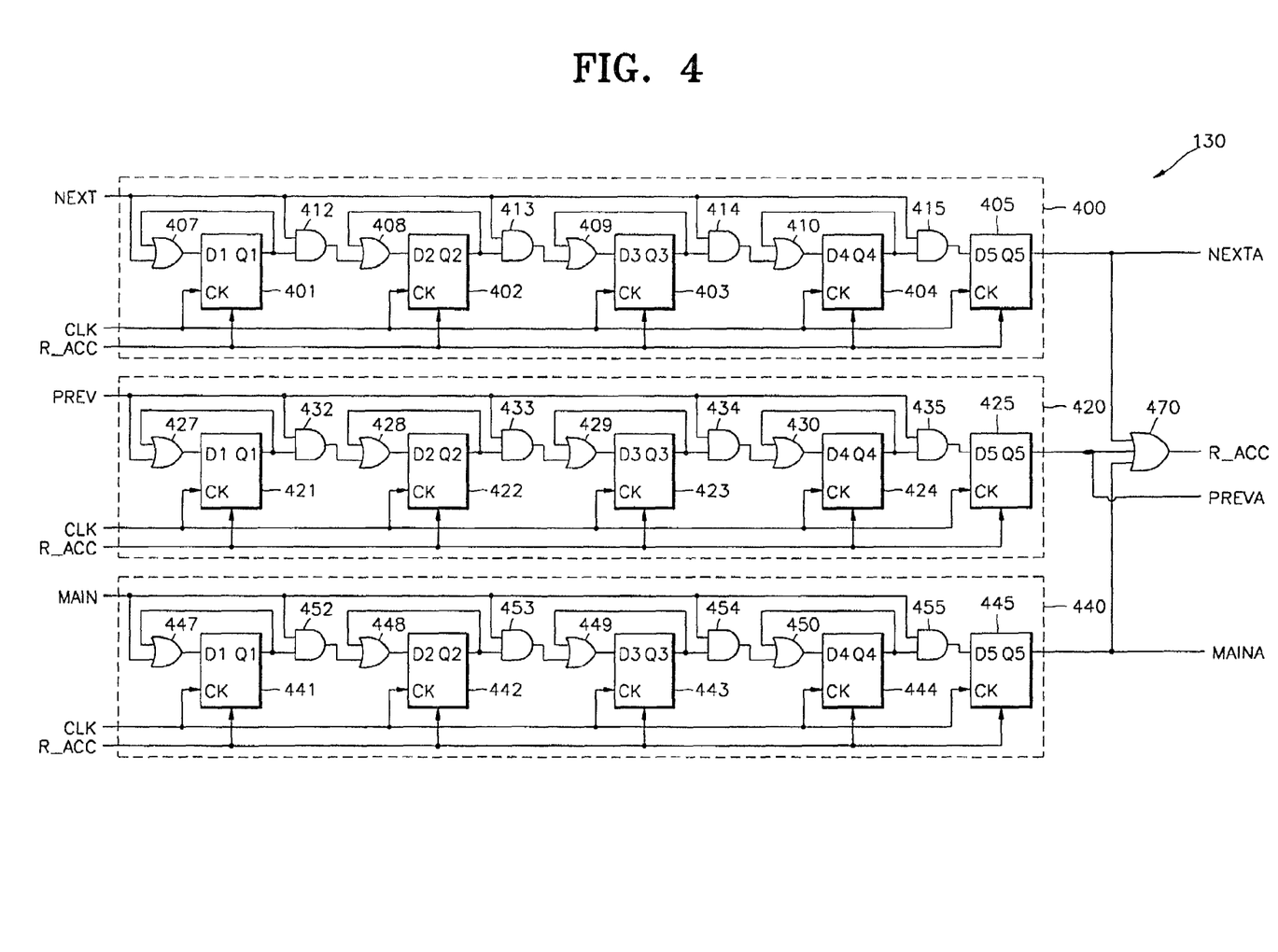
FIG. 4 is a circuit diagram illustrating a transition accumulator according to an embodiment of the present invention.

FIG. 4 is a circuit diagram of a preferred embodiment of the transition accumulator 130 of the apparatus shown in FIG. 1. The transition accumulator 130 comprises first, second and third accumulators 400, 420, and 440 and an OR gate 470 that operates as a reset signal generating means. The first accumulator 400 receives a first transition signal NEXT output from the level transition detector 120 and generates the first transition accumulation signal NEXTA by accumulating an applying a plurality of the first transition signal NEXT in response to the input clock signal CLK. For this operation, the first accumulator 400 comprises flip-flops 401–405, OR gates 407–410, and AND gates 412–415. The flip-flops 401–405 of the first accumulator 400 are reset in response to an accumulation reset signal R_ACC output through the OR gate 470.

During operation of the first accumulator 400, the OR gate 407 performs an OR operation on the first transition signal NEXT and the output signal Q1 of the flip-flop 401. The flip-flop 401 receives the output signal of the OR gate 407 as the data input D1 and generates an output signal Q1 in response to the input clock signal CLK. The AND gate 412 performs an AND operation on the first transition signal NEXT and the output signal Q1 of the flip-flop 401 and outputs the AND operation result. The OR gate 408 performs an OR operation on the output signal Q2 of the flip-flop 402 and the output signal of the AND gate 412 and applies the OR operation result to the data input D2 of the flip-flop 402. The flip-flop 402 receives the input data D2 and generates an output signal Q2 in response to the input clock signal CLK.

By a method similar to the above, the AND gate 413 performs an AND operation on the first transition signal NEXT and the output signal Q2 of the flip-flop 402 and applies the AND operation result to the input of the OR gate 409. Therefore, the flip-flop 403 receives the output signal of the OR gate 407 as the data input D3 and generates an output signal Q3 in response to the input clock signal CLK. Namely, when the first transition signal NEXT is accumulated five times by repeating such processes, the accumulated signal is output as the first transition accumulation signal NEXTA.

The structure and operation of the second accumulator 420 and the third accumulator 440 shown in FIG. 4 are similar to the structure and operation of the first accumulator 410 as described above. The second accumulator 420 comprises flip-flops 421–425, OR gates 427–430, and AND gates 432–435. The third accumulator 440 comprises flip-flops 441–445, OR gates 447–450, and AND gates 452–455. The difference between the second accumulator 420 and the third accumulator 440 is that the input signals of the second accumulator 420 and the third accumulator 440 are the second transition signal PREV and the third transition signal MAIN, respectively, and the accumulated output signals of the second accumulator 420 and the third accumulator 440 are the second transition accumulation signal PREVA and the third transition accumulation signal MAINA, respectively. Therefore, a detailed description of the structures and operations of the second accumulator and the third accumulator will be omitted.

The OR gate 470 of FIG. 4 performs an OR operation on the first, second and third transition accumulation signals NEXTA, PREVA, and MAINA and outputs the OR operation result as the accumulated reset signal R_ACC. The accumulated reset signal R_ACC is generated when one among the first through third transition accumulation signals NEXTA, PREVA, and MAINA is generated.

Figure 5:
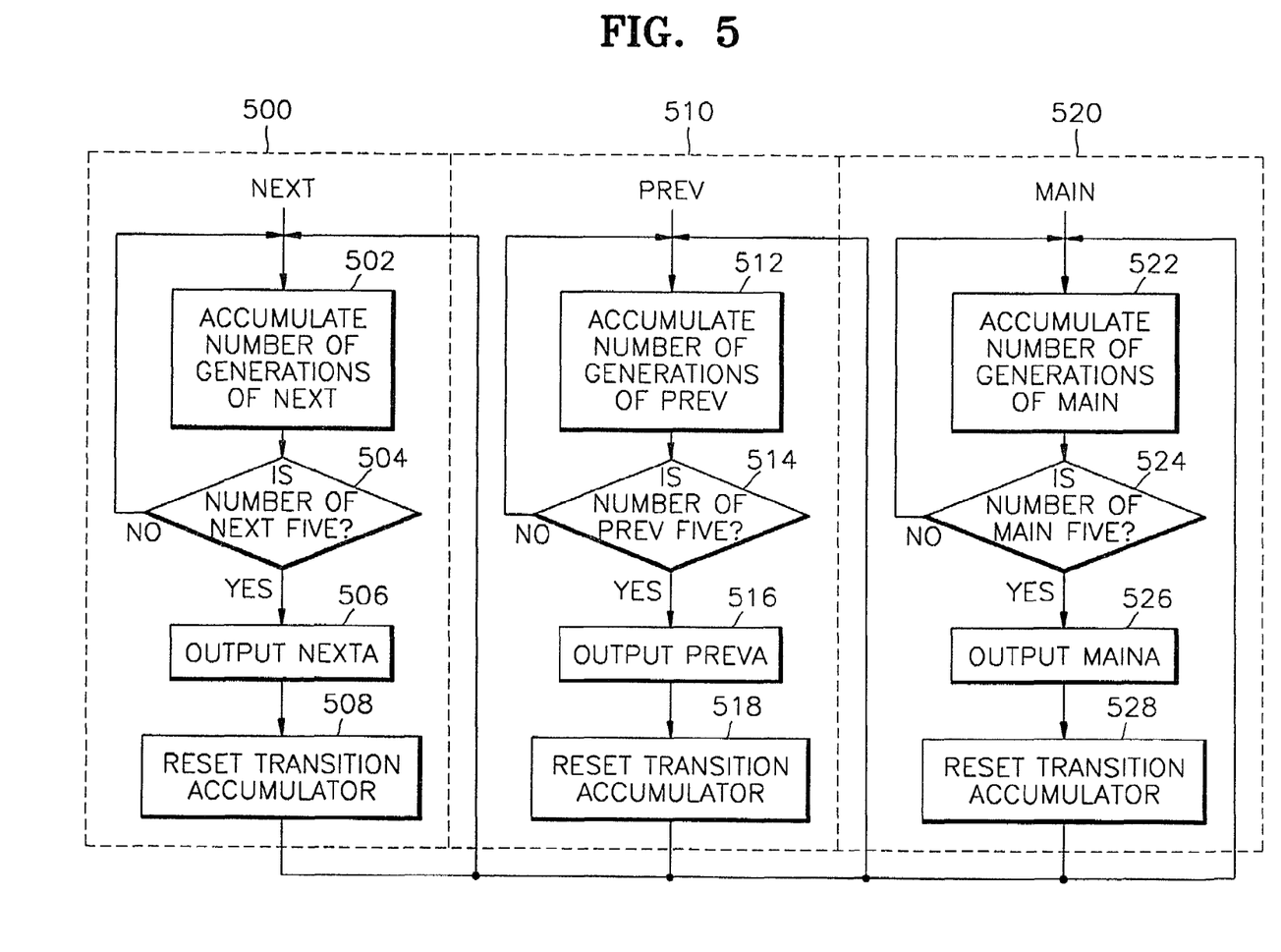
FIG. 5 is a flowchart illustrating operation of the transition accumulator according to one aspect of the present invention.

FIG. 5 is a flowchart of a method of operation of the transition accumulator 130 according to one aspect of the present invention. The method generally comprises steps of generating the first transition accumulation signal NEXTA (step 500), generating the second transition accumulation signal PREVA (step 510), and generating the third transition accumulation signal MAINA (step 520).

The operation of the transition accumulator 130 will now be described in detail with reference to FIGS. 4 and 5. During the process of generating the first transition accumulation signal NEXTA (step 500), the first accumulator 400 accumulates the input first transition signal NEXT in response to the input clock signal CLK (step 502). When the transition signal NEXT at the logic "high" level is applied to the first accumulator 400 shown in FIG. 4, the data input D1 applied to the flip-flop 401 transitions to the logic "high" level. At this time, the flip flop 401 generates output signal Q1 at the logic "high" level in response to the input clock signal CLK. Also, the AND gate 412 performs an AND operation on the second occurrence of the first transition signal NEXT and the output signal Q1 of the flip-flop 401 and generates a logic "high" level output signal. Then, the data input D2 of the flip-flop 402 transitions to the logic "high" level by the output of the OR gate 408. Therefore, the flip-flop 402 generates a logic "high" level output signal Q2 in response to the input clock signal CLK. When the third through fifth output signals NEXT are applied through such processes, the output signals Q3, Q4, and Q5 of the respective flip-flops 403 through 405 transition to the logic "high" level.

Therefore, referring to FIG. 5, a determination is made as to whether the number of generations of the first transition signal NEXT is equal to N, for example, 5 (step 504). This determination is made by determining whether the output of the flip-flop 405 transitions to the logic "high" level. Also, the determination of the number of generations N can be determined to vary according to the state of the oversampling bit and the applied system. When the number of generations of the first transition signal NEXT is five (affirmative determination in step 504), the first transition accumulation signal NEXTA is output (step 506) and the transition accumulator 130 is reset by generating the reset signal R_ACC (step 508).

The method of generating the second transition accumulation signal PREVA is similar to the above-described method for generating the first transition accumulation signal NEXTA. Namely, when the number of generations of the second transition signal PREV is five (affirmative determination in step 514), the second transition accumulation signal PREVA is generated (step 516), and the transition accumulator 130 is reset (step 518). The process of generating the third transition accumulation signal MAINA is similar to the processes for generating NEXTA and PREVA and, a detailed description thereof will be omitted.

When one input of a signal among the first, second and third transition signals NEXT, PREV, and MAIN is accumulated five times, the accumulated signal is generated as the transition accumulation signal of the transition accumulator 130. Also, when the transition accumulation signal is generated, since the accumulation reset signal R_ACC transitions, the accumulators 400, 420, and 440 are simultaneously reset and receive a new signal.

Figure 6:
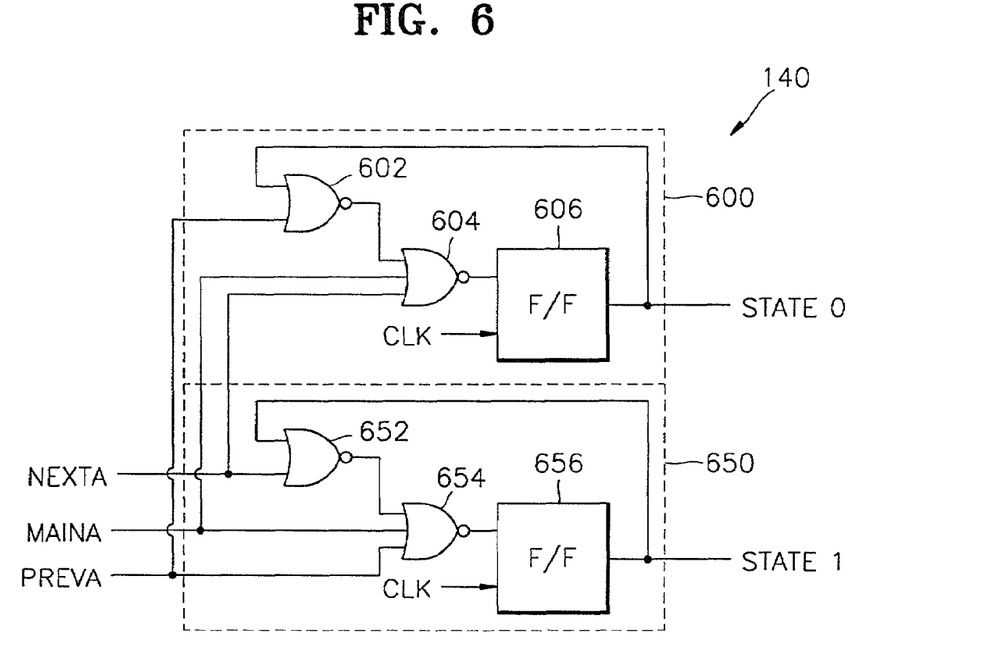
FIG. 6 is a circuit diagram illustrating a state selector according to an embodiment of the present invention.

FIG. 6 is a circuit diagram illustrating a state selector 140 of the apparatus shown in FIG. 1 according to a preferred embodiment. The state selector 140 comprises a first state signal generator 600 and a second state signal generator 650. The first state signal generator 600 performs a logic combination of the first, second and third transition accumulation signals NEXTA/PREVA/MAINA output from the transition accumulator 130 and outputs the logic combination result as a first state signal STATE 0 in response to the input clock signal CLK. To execute this logic operation, the first state signal generator 600 comprises NOR gates 602 and 604 and a flip-flop 606. The NOR gate 602 of the first state signal generator 600 performs a NOR operation on the output signal of the flip-flop 606 (i.e., the first state signal STATE 0) and the second transition accumulation signal PREVA and outputs the NOR operation result. The NOR gate 604 performs a NOR operation on the output of the NOR gate 602, the first transition accumulation signal NEXTA, and the third transition accumulation signal MAINA and outputs the NOR operation result. The flip-flop 606 receives as input the output signal of the NOR gate 604 and generates the state signal STATE 0 in response to the clock signal CLK.

Further, the second state signal generator 650 performs a logic combination of the first, second and third transition accumulation signals NEXTA/PREVA/MAINA and outputs the logic combination result as a second state signal STATE1 in response to the input clock signal CLK. To execute this logic operation, the second state signal generator 650 comprises NOR gates 652 and 654 and a flip-flop 656. Namely, the NOR gate 652 performs a NOR operation on the output signal of the flip-flop 656 (i.e., the second state signal STATE1) and the first transition accumulation signal NEXTA and outputs the NOR operation result. In FIG. 6, the first state signal STATE0 and the second state signal STATE1 denote a state signal STATE[0:1] expressed by a combination of two bits.

Figure 7:
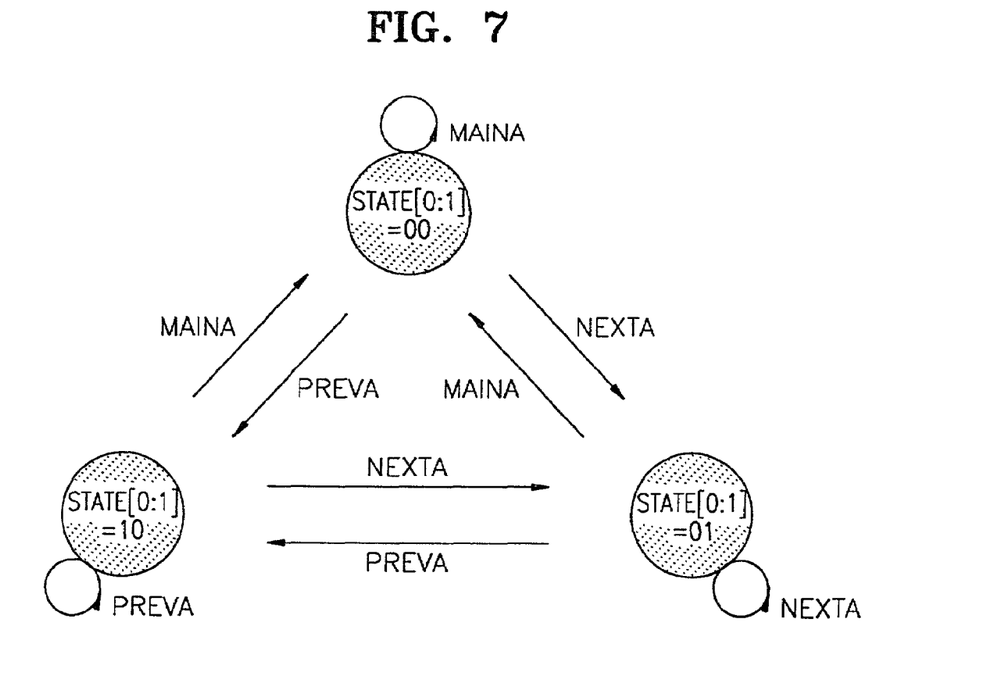
FIG. 7 illustrates an operation of a state selector according to one aspect of the present invention.

FIG. 7 is a state diagram that illustrates an operation of the state selector 140 shown in FIG. 6 according to one aspect of the present invention. The operation of the state selector 140 will be described in detail with reference to FIGS. 6 and 7. When the third transition accumulation signal MAINA is generated in the transition accumulator 130, the output of the NOR gate 604 of the first state signal generator 600 and the output of the NOR gate 654 of the second state signal generator 650 transition to the logic "low" level. Therefore, the flip-flops 606 and 656 output the first state signal STATE0 and the second state signal STATE1 at the logic "low" level in response to the clock signal CLK. Referring to FIG. 7, when the third transition accumulation signal MAINA is output, the state signal STATE[0:1] is set to be "00". Also, when another transition accumulation signal is not generated or when the third transition accumulation signal MAINA is continuously generated, the state signal STATE[0:1] continuously maintains "00". When the output signal of the transition accumulator 140 transitions into the second transition accumulation signal PREVA or the first transition accumulation signal NEXTA from the third transition accumulation signal MAINA, the state signal STATE [0:1] changes from "00" to another value.

When the output signal of the transition accumulator 130 becomes the first transition accumulation signal NEXTA, the output of the NOR gate 604 of the first state signal generator 600 transitions to the logic "low" level and the first state signal STATE0 output through the flip-flop 606 transitions to the logic "low" level. At this time, the output of the NOR gate 652 of the second state signal generator 650 transitions to the logic "low" level and the output of the NOR gate 654 transitions to the logic "high" level. Therefore, the second state signal STATE1 output through the flip-flop 656 is at the logic "high" level, i.e., it has the value "1". As a result, when the first transition accumulation signal NEXTA is generated, the state signal STATE[0:1] becomes "01". Also, when another transition accumulation signal is not applied and the first transition accumulation signal NEXTA is continuously applied, the state signal STATE[0:1] is maintained to be "01".

When the output signal of the transition accumulator 130 is the second transition accumulation signal PREVA, the first state signal STATE0 output from the first state signal generator 600 transitions to the logic "high" level and the second state signal STATE1 output from the second state signal generator 650 transitions to the logic "low" level. Therefore, the state signal STATE [0:1] has the value "10". FIG. 7 illustrates in detail the bit value of the state signal STATE[0:1] generated by the respective transition accumulation signals, which are generated by the above-mentioned process, and changes into the respective states. Namely, transition to the next state is performed by the transition accumulation signal generated on the basis of the current state.

Figure 8:
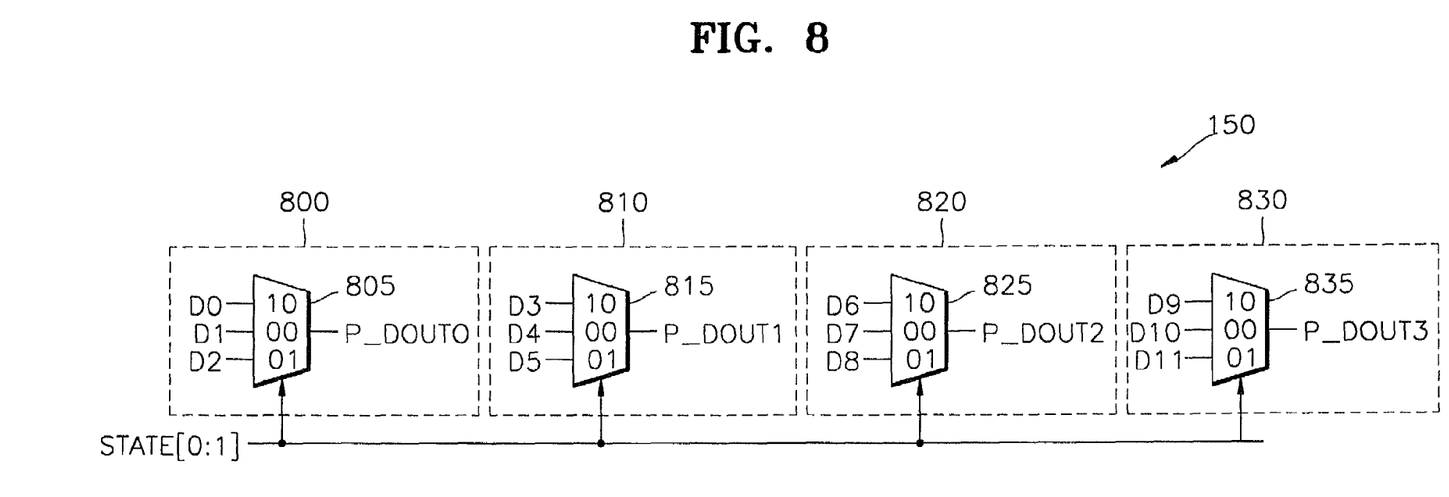
FIG. 8 is a circuit diagram illustrating a data selector according to an embodiment of the present invention.

FIG. 8 is a circuit diagram illustrating a preferred embodiment of the data selector 150 illustrated in FIG. 1. In general, the data selector 150 comprises first, second, third and fourth selectors 800, 810, 820, and 830. The selectors 800–830 select bits of corresponding positions among the oversampling data items output from the three-times oversampler 110, corresponding to the state signal STATE determined by the transition accumulation signals NEXTA, PREVA, and MAINA.

Preferably, the selectors 800, 810, 820 and 830 comprise multiplexers 805, 815, 825, and 835, respectively. The number of multiplexers 805, 815, 825, and 835 is equal to the number of bits to be changed into parallel data. In the exemplary embodiment, the number of bits output in parallel is four. The multiplexer 805 receives continuous three bits D0, D1, and D2 among the twelve bits of data output from the three times oversampler 110 and selects one bit in response to the state signal STATE. Here, the output signal of the multiplexer 800 becomes lower bit data P_DOUT0 among the four bits of parallel data. The multiplexer 815 receives the next continuous three bits D3, D4, and D5 and selects one bit among the three bits in response to the state signal STATE. At this time, the signal selected by the multiplexer 815 becomes the second bit P_DOUT1 among the four bits of parallel data. Also, the multiplexer 825 receives the data of the next three bits D6, D7, and D8 and selects one bit among the three bits in response to the state signal STATE. At this time, the signal selected by the multiplexer 825 becomes the third bit P_DOUT2 among the four bits of parallel data. The multiplexer 835 receives the last continuous three bits D9, D10, and D11 and selects one bit among the three bits. The output signal of the multiplexer 835 becomes the fourth bit, that is, the most significant bit P_DOUT3, among the four bits of parallel data.

Figure 9:
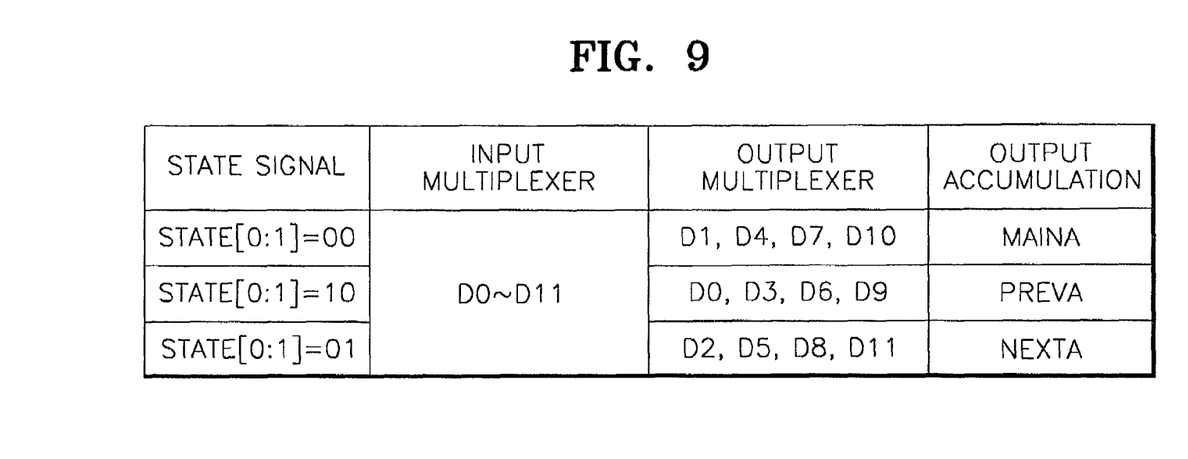
FIG. 9 illustrates an operation of a data selector according to one aspect of the present invention.

FIG. 9 illustrates an operation of the data selector 150 according to one aspect of the present invention. In FIG. 8, the respective multiplexers 805, 815, 825, and 835 select and output second bit data when the state signal STATE is 00, select first bit data when the two-bit value of the state signal STATE is 10, and select third bit data when the two-bit value of the sate signal STATE is 01. More specifically, FIG. 9 illustrates a classification of the output data corresponding to the bit value of each state signal STATE[0:1]. For example, when the state signal STATE is 00, the point of time at which transition in the level between the respective bits occurs is set to be "MAIN" of FIG. 3C. Therefore, the data output through the respective multiplexers 805, 815, 825, and 835 are D1, D4, D7, and D10. Also, when the state signal STATE is 10, the point of time at which the transition in the level occurs between the respective bits is set to be "PREV" of FIG. 3B. Therefore, the data output through the multiplexers 805, 815, 825 and 835 are D0, D3, D6, and D9. Further, when the state signal STATE is 01, the point of time at which the transition in the level occurs between the respective bits is set to be "NEXT" of FIG. 3A. Therefore, the data output through the multiplexers 805, 815, 825 and 835 are D2, D5, D8, and D11.

Figure 10:
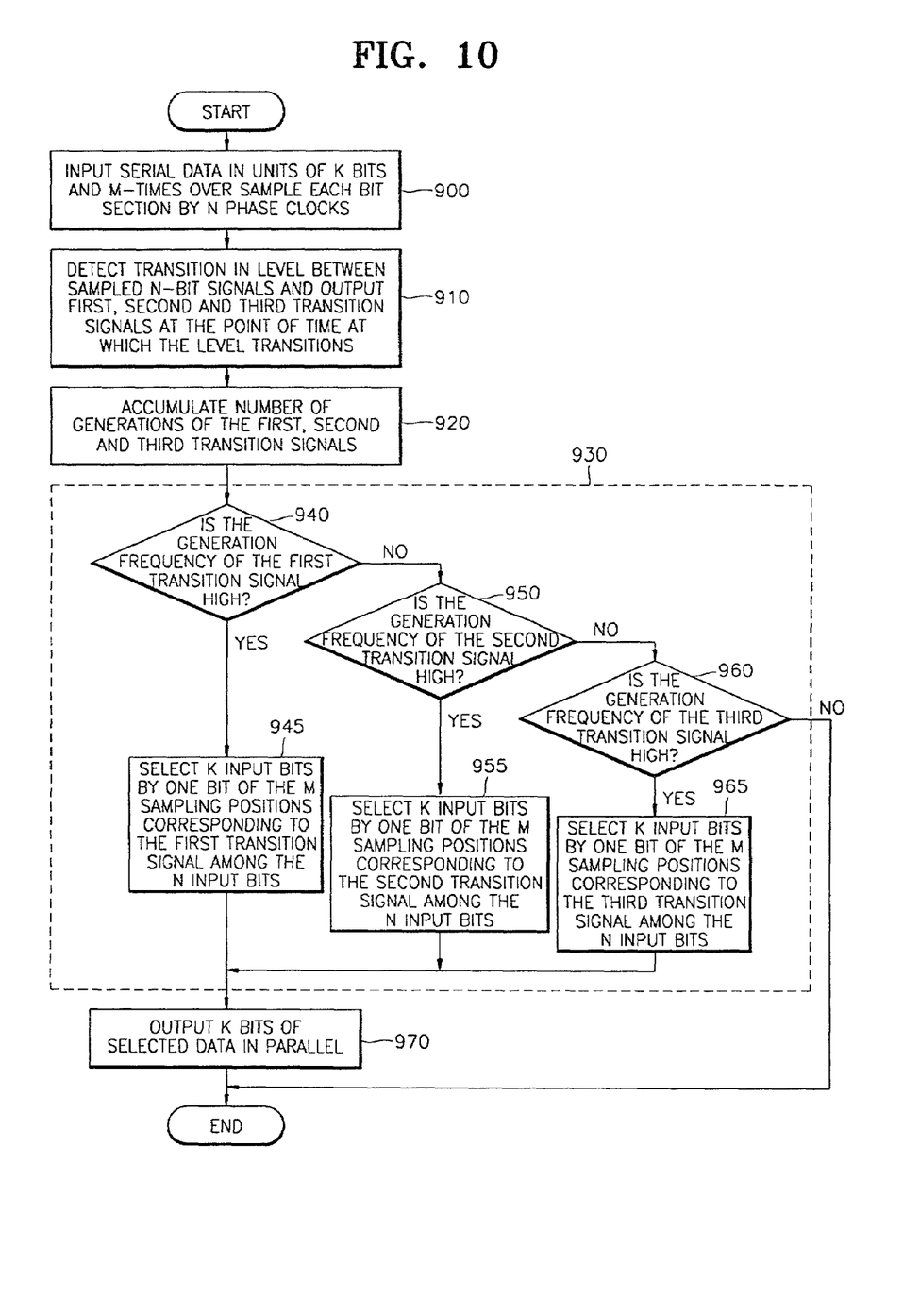
FIG. 10 is a flowchart illustrating a data recovery method according to one aspect of the present invention.

FIG. 10 is a flow diagram of a data recovery method for minimizing errors due to clock skew according to one aspect of the present invention. The data recovery method of FIG. 10 will be described with reference to FIGS. 1 through 9. The three times oversampler 110 three times oversamples input serial data in units of K bits, for example, four bits in response to twelve phase clock signals PH_CLK (step 900). The level transition detector 120 detects the transition in the level between three times oversampled N bit, for example, twelve bit signals, and outputs first through third transition signals NEXT, PREV, and MAIN at the point of time at which the level transitions (step 910). At this time, the transition accumulator 130 accumulates the first through third transition signals NEXT, PREV, and MAIN until the number of generations of the first through third transition signals NEXT, PREV, and MAIN becomes a predetermined number (step 920).

Next, in step 930, the signal having the greatest generation frequency is highest is detected by the result of accumulating the number of generations of the first through third transition signals NEXT, PREV, and MAIN (in step 920) and corresponding bit data among the oversampling bit data is selected corresponding to the detected signal. In step 930, the signal whose generation frequency is high is detected by detecting whether one among the first through third transition accumulation signals NEXTA, PREVA, and MAINA is generated, since the number of generations of the first through third transition signals NEXT, PREV, and MAIN becomes a predetermined number.

More specifically, is it determined whether the generation frequency of the first transition signal NEXT is high (step 940). When it is determined that the generation frequency of the first transition signal NEXT is high (affirmative determination in step 940), the data selector 150 selects four data items D2, D5, D8, and D11 one by one among three sampling positions corresponding to the accumulated first transition signal NEXT (step 945). Here, the process of selecting data is determined based on the bit value of the state signal STATE generated by the first transition accumulation signal NEXTA. As illustrated in the embodiment of FIG. 1, when serial data is applied in units of four bits and three times oversampling is performed, the four data items output from the data selector 150 can be represented to be 3P+2th (P is an integer no less than 0) bit data.

If it is determined that the generation frequency of the first transition signal NEXT is not high (negative determination in step 940), a determination is made as to whether the generation frequency of the second transition signal PREV is high (step 950). If it is determined that the generation frequency of the second transition signal PREV is high (affirmative determination in step 950), the data selector 150 selects four data items D0, D3, D6, and D9 one by one among the three sampling positions corresponding to the accumulated second transition signal PREV (step 955). Namely, the output data can be represented to be 3pth data in the data selector 150.

If it is determined that the generation frequency of the second transition signal PREV is not high (negative determination in step 950), a determination is made as to whether the generation frequency of the third transition signal MAIN is high (step 960). If it is determined that the generation frequency of the third transition signal MAIN is high (affirmative determination in step 960), the data selector 150 selects four data D1, D4, D7, and D10 among the three sampling positions corresponding to the accumulated third transition signal MAIN (step 965). Here, the output data can be represented to be 3P+1th bit data. After the step 965, the data selector 150 outputs four data items output by one bit through the respective multiplexers in parallel (step 970)

As mentioned above, in the present invention, the point of time at which the level of the currently input data transitions, is detected according to the conditions of the clock skew and the bit data to be output by the detection result is selected. Therefore, even though the clock skew is generated, the data recovery apparatus according to the present invention outputs bit data in a stable state among the three times sampled bits.

According to the present invention, since the output data is determined by detecting the generation frequency of the transition in the level of the output signal according to the clock skew with respect to the input serial data, it is possible to select the bit data in the stable state. Therefore, according to the present invention, it is possible to minimize the errors due to the clock skew, which can be generated during recovering of the data.

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A data recovery apparatus, comprising:
    a phase locked loop (PLL) for generating a plurality of phase clock signals each having a different delay time with respect to a clock signal;
    an oversampler for M times oversampling serial input data in response to the plurality of phase clock signals and outputting a plurality of data bits in parallel, wherein M is an integer;
    a level transition detector for receiving the parallel data bits output from the oversampler, detecting logic level transitions between successive bits of the parallel data bits and generating a detection result as one of M transition signals;
    a transition accumulator for accumulating a number of times each one of the M transition signals is generated and outputting a transition accumulation signal corresponding to the transition signal whose generation frequency is highest, the transition accumulation signal comprising one of M transition accumulation signals, wherein the transition accumulator comprises a reset signal generator for performing a logical combination of the M transition accumulation signals and generating an accumulation reset signal for resetting the transition accumulator in response to the logical combination result;
    a state selector for generating a state signal in response to the transition accumulation signal output from the transition accumulator, wherein the state signal is used for selecting corresponding data bits among the parallel data bits output from the oversampler; and a data selector for receiving the parallel data bits, utilizing the state signal to select from the parallel data bits those data bits having sampling positions corresponding to the state signal, and outputting the selected data bits in parallel.

2. The data recovery apparatus of claim 1, wherein M is 3.

3. The data recovery apparatus of claim 2, wherein the level transition detector comprises:

a transition detector comprising a plurality of exclusive OR gates for performing an exclusive OR operation on successive bits of the parallel data bits output from the oversampler and generating exclusive OR results as first, second, and third output signals; and a transition detection signal outputting unit for processing the first, second, and third output signals to generate and output a first, second or third transition signal as a result of said processing.

4. The data recovery apparatus of claim 3, wherein the transition accumulator comprises:

a first accumulator for accumulating the first transition signal in response to an input clock signal and outputting a first transition accumulation signal when a predetermined number of first transition signals are accumulated;

a second accumulator for accumulating the second transition signal in response to the input clock signal and outputting a second transition accumulation signal when a predetermined number of second transition signals are accumulated;

a third accumulator for accumulating the third transition signal in response to the input clock signal and outputting a third transition accumulation signal when a predetermined number of third transition signals are accumulated; and wherein the reset signal generator performs the logical combination on the first, second, and third transition accumulation signals and generates the accumulation reset signal for resetting the first, second, and third accumulators in response to the logical combination result.

5. The data recovery apparatus of claim 4, wherein the transition accumulator outputs one of the first, second, and third transition signal having the highest generation frequency as a corresponding one of the first, second, and third transition accumulation signals.

6. The data recovery apparatus of claim 4, wherein the state signal generated by the state selector comprises a two-bit signal comprising a first and second bit, to indicate which of the first, second and third transition accumulation signals is generated.

7. The data recovery apparatus of claim 6, wherein the first and second bits are respectively set to logic "0" and "1" when the first transition accumulation signal is generated, logic "1" and "0" when the second transition accumulation signal is generated, and logic "0" and "0" when the third transition accumulation signal is generated.

8. The data recovery apparatus of claim 7, wherein the data selector comprises a plurality of multiplexers m(i), wherein each multiplexer receives M bits of the parallel data bits output from the oversampler and selectively outputs one bit among the received M bits in response to the state signal.

9. The data recovery apparatus of claim 8, wherein each multiplexer m(i) (i=1, 2, 3, 4) receives the M bits of the parallel data bits at bit positions D(p) where p=(3P, 3P+1, 3P+2) and P=i−1, and wherein the data selector outputs the 3P+2 bits from each of the plurality of multiplexers m(i) when the state signal is "01", outputs the 3P bits from each of the plurality of multiplexers m(i) when the state signal is "10", and outputs the 3P+1 bits from each of the plurality of multiplexers m(i) when the state signal is "00".

10. A data recovery method comprising the steps of:
(a) receiving as input serial data in blocks of K bits and performing an M times oversampling on each block of serial data using N phase clock signals having different delay times to output N data bits in parallel, wherein K, M, and N are integers;
(b) detecting a level transition between successive bits of the N data bits and generating a transition signal when the level transition is detected, the transition signal comprising one of M transition signals;
(c) accumulating a number of generations of each of the M transition signals and outputting a transition accumulation signal corresponding to a transition signal whose generation frequency meets a predefined threshold, the transition accumulation signal comprising one of M transition accumulation signals;
(d) performing a logical combination of the M transition accumulation signals and generating an accumulation reset signal for resetting the accumulating step in response to the logical combination result; and
(e) selecting from the N data bits, K data bits corresponding to the transition signal whose generation frequency meets the predefined threshold.

11. The data recovery method of claim 10, wherein M is 3.

12. The data recovery method of claim 11, wherein K is 4 and N is 12.

13. The data recovery method of claim 11, wherein the N parallel data bits include bits D(i) (i=0, . . . N−1) and wherein step (e) comprises the steps of:

selecting K data bits from the N parallel data bits at positions D(3P+2), for (P=0, . . . K−1), corresponding to a first transition signal of the M transition signals when the first transition signal is the transition signal whose generation frequency meets the predefined threshold;

selecting K data bits from the N parallel data bits at positions D(3P), for (P=0, . . . K−1), corresponding to the second transition signal when the second transition signal is the transition signal whose generation frequency meets the predefined threshold; and selecting K data bits from the N parallel data bits positions D(3P+1), for (P=0, . . . K−1), corresponding to the third transition signal when third transition signal is the transition signal whose generation frequency meets the predefined threshold.

14. The data recovery method of claim 10, wherein step (e) comprises the step of generating a state signal comprising a predetermined value based on the transition signal whose generation frequency meets the predefined threshold and selecting the N data bits based on the value of the state signal.

15. A program storage device readable by a machine, tangibly embodying a program of instructions executable by the machine to perform method steps for recovering data, the method comprising the steps of:
(a) receiving as input serial data in blocks of K bits and performing an M times oversampling on each block of serial data using N phase clock signals having different delay times to output N data bits in parallel, wherein K, M, and N are integers;

(b) detecting a level transition between successive bits of the N data bits and generating a transition signal when the level transition is detected, the transition signal comprising one of M transition signals;

(c) accumulating a number of generations of each of the M transition signals and outputting a transition accumulation signal corresponding to a transition signal whose generation frequency meets a predefined threshold, the transition accumulation signal comprising one of M transition accumulation signals;

(d) performing a logical combination of the M transition accumulation signals and generating an accumulation reset signal for resetting the accumulating step in response to the logical combination result; and (e) selecting from the N data bits, K data bits corresponding to the transition signal whose generation frequency meets the predefined threshold.

16. The program storage device of claim 15, wherein M is 3.

17. The program storage device of claim 16, wherein the N parallel data bits include bits $D(i)$ ($i=0, \ldots N-1$), and wherein the instructions for performing step (e) comprise instructions for performing the steps of:

selecting K data bits from the N parallel data bits at positions $D(3P+2)$, for ($P=0, \ldots K-1$), corresponding to a first transition signal of the M transition signals when the first transition signal is the transition signal whose generation frequency meets the predefined threshold;

selecting K data bits from the N parallel data bits at positions $D(3P)$, for ($P=0, \ldots K-1$), corresponding to the second transition signal when the second transition signal is the transition signal whose generation frequency meets the predefined threshold; and selecting K data bits from the N parallel data bits at positions $D(3P+1)$, for ($P=0, \ldots K-1$), corresponding to the third transition signal when third transition signal is the transition signal whose generation frequency meets the predefined threshold.

18. The program storage device of claim 15, wherein the instructions for performing step (e) comprise instructions for performing the steps of generating a state signal comprising a predetermined value based on the transition signal whose generation frequency meets the predefined threshold and selecting the N data bits based on the value of the state signal.

19. A circuit for recovering data, the circuit comprising:

a first circuit for performing an M times oversampling on a block of input serial data using N phase clock signals having different delay times and outputting N data bits in parallel, wherein M and N are integers;

a second circuit for detecting a level transition between successive bits of the N data bits and generating a transition signal when a level transition is detected, the transition signal comprising one of M transition signals;

a third circuit for accumulating a number of generations of each of the M transition signals and outputting a transition accumulation signal corresponding to a transition signal whose generation frequency meets a predefined threshold, the transition accumulation signal comprising one of M transition accumulation signals;

a fourth circuit for performing a logical combination of the M transition accumulation signals and generating an accumulation reset signal for resetting the accumulating process in response to the logical combination result; and a fifth circuit for selecting from the N data bits, K data bits corresponding to the transition signal whose generation frequency meets the predefined threshold, wherein K is an integer.

\* \* \* \* \*